(12) United States Patent
Vinroe

(10) Patent No.: US 11,117,199 B1
(45) Date of Patent: Sep. 14, 2021

(54) TOOL JIG AND METHOD OF USE

(71) Applicant: Jordan J. Vinroe, Portersville, PA (US)

(72) Inventor: Jordan J. Vinroe, Portersville, PA (US)

( * ) Notice: Subject to any disclaimer, the term of this patent is extended or adjusted under 35 U.S.C. 154(b) by 0 days.

(21) Appl. No.: 16/602,523

(22) Filed: Oct. 23, 2019

Related U.S. Application Data

(60) Provisional application No. 62/766,518, filed on Oct. 23, 2018.

(51) Int. Cl.
*B23B 47/28* (2006.01)
*B23B 35/00* (2006.01)
*F41A 3/66* (2006.01)

(52) U.S. Cl.
CPC .............. *B23B 47/28* (2013.01); *B23B 35/00* (2013.01); *F41A 3/66* (2013.01)

(58) Field of Classification Search
CPC ....... B23B 47/287; B23B 47/28; B23B 49/02; B23B 49/023; B23B 49/026; B23B 2215/28; B23B 35/00; B23B 2247/12; Y10T 408/03; Y10T 408/567; Y10T 408/568; F41A 3/66; B23Q 3/062; B23Q 2703/10
See application file for complete search history.

(56) References Cited

U.S. PATENT DOCUMENTS

| | | | | |
|---|---|---|---|---|
| 5,281,058 A | * | 1/1994 | Hill ..................... | B23B 47/288 |
| | | | | 408/115 R |
| 9,982,958 B1 | * | 5/2018 | Partington ............... | F41A 3/66 |
| 10,099,329 B1 | * | 10/2018 | Smith .................... | B23Q 3/062 |
| 10,391,591 B2 | * | 8/2019 | Smith .................... | B23P 13/02 |

* cited by examiner

*Primary Examiner* — Eric A. Gates
*Assistant Examiner* — Chwen-Wei Su
(74) *Attorney, Agent, or Firm* — Robert B. Famiglio; Famiglio & Associates

(57) ABSTRACT

A custom-made tool used to control the location and/or movement of parts to be worked to complete an unfinished metal structure into a completed firearm receiver. The tool is a two-part jig fashioned especially for building a handgun receiver from a pre-shaped metal works without the need for other industrial tools or apparatus. Using only commonly available tools in most home work shops, the disclosed jig facilitates producing a firearm receiver from an unfinished metal structure. This disclosure also teaches a method for creating a completed pistol receiver from an unfinished metal structure using the invention.

4 Claims, 4 Drawing Sheets

TOOL JIG AND METHOD OF USE

CROSS REFERENCE TO RELATED APPLICATIONS

This application claims the benefit of Applicant's provisional patent application Ser. No. 62/766,518 filed Oct. 23, 2018, entitled A Tool Jig & Method of Building a Handgun Receiver.

BACKGROUND OF THE INVENTION

1. Field of the Invention

This invention relates to a specialized tool jig, and in particular a metal forming jig used to provide repeatability, accuracy, and interchangeability in the manufacturing of specific firearm-type metal workings.

2. Background Art

Many firearms enthusiasts would like to build their own legal, custom-tailored pistol for lawful purposes. It is known by those skilled in the field that a custom, preformed and partially manufactured metallic structure provides an inexpensive way for a firearm enthusiast to legally form and complete their own custom pistol similar to a product that is available on the market by using other preformed or manufactured parts that can be separately obtained on the market. In such a fashion, a gun-smithing enthusiast can fabricate a pistol for personal use and customize it while also saving money.

A firearm lower receiver, considered the main part of the given firearm which defines a device as a firearm, is unregulated until a minimum level of manufacturing is completed. The Bureau of Alcohol, Tobacco and Firearms ("BATF") in the United States regulates the production and sale of firearms. Licensing and approval of the main portion of the firearm for manufacturing and sale is necessary in most instances.

A firearm receiver is the part of a firearm that is subject to strict regulation. However, in the United States the law allows an individual to legally construct their own firearm by fashioning the metalwork necessary and then applying other non-regulated parts and materials to complete the firearm. Naturally, the BATF regulates this activity and requires registration of the custom-built firearm when completed. An amateur gunsmith or other firearm enthusiasts building a custom pistol may wish to purchase stamped or forged metal parts to allow them to fabricate the pistol. To allow such a person to comply with the law, the BATF will provide an opinion as to whether a proposed unfinished metalwork is categorized as a firearm receiver requiring registration before purchase or sale, or is a legal product to purchase and possess without registration. In other words, does the metalwork offered for individual use in manufacturing a product rise to the level of being a regulated product or device? Metalwork and such articles of manufacture that are offered to those wishing to produce a custom pistol require substantial work in order to be constructed later with other unregulated parts such as barrels, slides, triggers, hammers, disconnectors and other products that can be properly purchased for application in building such a firearm without those parts being regulated.

Articles of manufacture, or metalwork in this category are typically referred to as eighty percent (80%) receivers, meaning they are legal to possess and own by individuals but are not completed firearms, are not classified as a firearm, and must be substantially metal-worked to create a properly transformed end product before it could be classified as a firearm.

An article of manufacture such as that disclosed are completed by the end user in order to be operable because they are sold in a condition where they are not classified as a firearm. In a typical configuration for a pistol, an article of manufacture to be completed into a receiver is cast or forged in a partially machined fashion with certain aspects of the geometry of the receiver remaining uncut and uncompleted. The finishing task to transform a partially formed piece of metal into a final suitable receiver form capable of accepting other parts manufactured for a given pistol requires cutting and drilling with appropriate dimensions and accuracy in order to have the receiver ready to apply to other firearm parts to complete the firearm.

Other such parts are not required to be registered and in themselves are not considered to be firearms. By the working of an article of manufacture, sometimes referred to in the industry as an eighty percent (80%) receiver, to a completed form, that receiver can then be made into a finished firearm by other parts that are readily available in a finished state. Firearm enthusiast and gunsmiths can produce a custom pistol by using commonly available parts that fit onto the finished article of manufacture.

The metal-working and completion of a final and acceptable receiver is time consuming and the quality of results may be difficult to achieve without having the proper tooling and experience. In accordance with the prior art, finishing the receiver requires drilling and a rotary power tool. Finishing the receiver after drilling and cutting holes at the precise required location is made easier with the disclosed invention. Then, polishing and finishing any rough surfaces is required.

Prior art techniques in finishing a receiver can produce poor results because of the inaccuracies in measuring, drilling and polishing. The disclosed jig solves this problem. A tool jig's primary purpose is to provide repeatability, accuracy, and interchangeability in the manufacturing of a specific product. While a fixture could hold the article of manufacture in a fixed location so that tools can be used on it to work the piece, a jig is a device that does both functions (holding the work and guiding a tool), usually for a particular purpose.

It is the object of the present invention to provide a tool jig assembly that assists the user in measuring and identifying the proper areas to drill, tap and/or polish the required holes and manipulation of an eighty percent (80%) pre-shaped receiver to avoid mis-measurements and to eliminate the need for sophisticated vises, clamps and drill presses which add complication to the process and increase error in final forming and manufacturing.

It is also the object of the present invention to illustrate a method of forming a firearm receiver from what is commonly referred to as an eighty percent (80%) receiver.

SUMMARY OF THE INVENTION

The present invention is an apparatus and method for a gunsmith or firearm enthusiast to construct and complete a firearm receiver from an 80% completed article of manufacture to a final product for individual use within the rules and regulations administered by the BATF. In that regard, typically firearm receivers can be crafted from an unfinished firearm receiver that is an article of manufacture shaped as disclosed in the drawings. Such an unfinished article of manufacturing as shown in the present disclosure is not considered to be a firearm which needs to be registered until fully completed and operational.

The present invention is a specialized tool jig which allows the user to properly complete and work what is commonly referred to as an 80% completed handgun firearm receiver into a finished product which can be used with other parts which can be legally purchased to build a custom firearm. Many users prefer to produce their own custom firearm which can be worked individually to be more precise and to have different custom features that may not be available with other factory produced firearms.

In the preferred embodiment, the present tool jig that is disclosed is fashioned specifically for a common brand firearm so that the receiver completed using the tool disclosed can be used with other factory built accessories to complete the firearm such as the pistol grip, firing pins and other types of accessories normally required for a complete handgun. In the present disclosure, the invention is specifically fashioned to allow a completed article of manufacture into a pistol receiver which will accept parts manufactured to fit a Sig Sauer brand receiver such as a P320. The jig disclosed and the method illustrated can also be configured to construct similar pistols.

The design of the article of manufacture which is used in the tool jig in the present disclosure is not a firearm. However, the article may be used to legally manufacture a firearm by enhancing the formation of a pre-manufactured stamped metal piece which can be used to manufacture a pistol by use of the specialized tool jig disclosed and using the method described herein. Also, the method of forming an article of manufacture is described providing a step by step process for working a pre-manufactured, stamped metal piece.

The tool jig consists of two major pieces. The main body of the jig has a left and right side which mate together with machine screws to form a cavity opening which allows an unfinished firearm receiver to be dropped therein and worked more easily to complete the tooling required. The second part or top plate of the jig is used both to assist in forming the receiver rails and thereafter completing the metal working of the to-be-formed receiver rails to allow them to be sawed off and excess metal removed in forming a receiver as demonstrated by the various figures.

The tool jig also has various holes pre-drilled which are fashioned such as to emulate the machining and drill holes that would be necessary to finalize the firearm receiver to work with the factory parts that are commonly available other than the firearm receiver itself. Such parts would readily attach to the receiver completed using the invention thereby allowing a complete firearm to be constructed.

The present disclosure also illustrates a method of finishing an 80% receiver for an automatic pistol type firearm. The disclosure describes steps useful in fashioning and forming the receiver without having specialized industrial tools, drill presses, or other larger pieces of machining equipment to form the changes necessary to transform a pre-fashioned 80% receiver into a finished firearm.

DESCRIPTION OF THE INVENTION IN A PREFERRED EMBODIMENT

Figure 1:
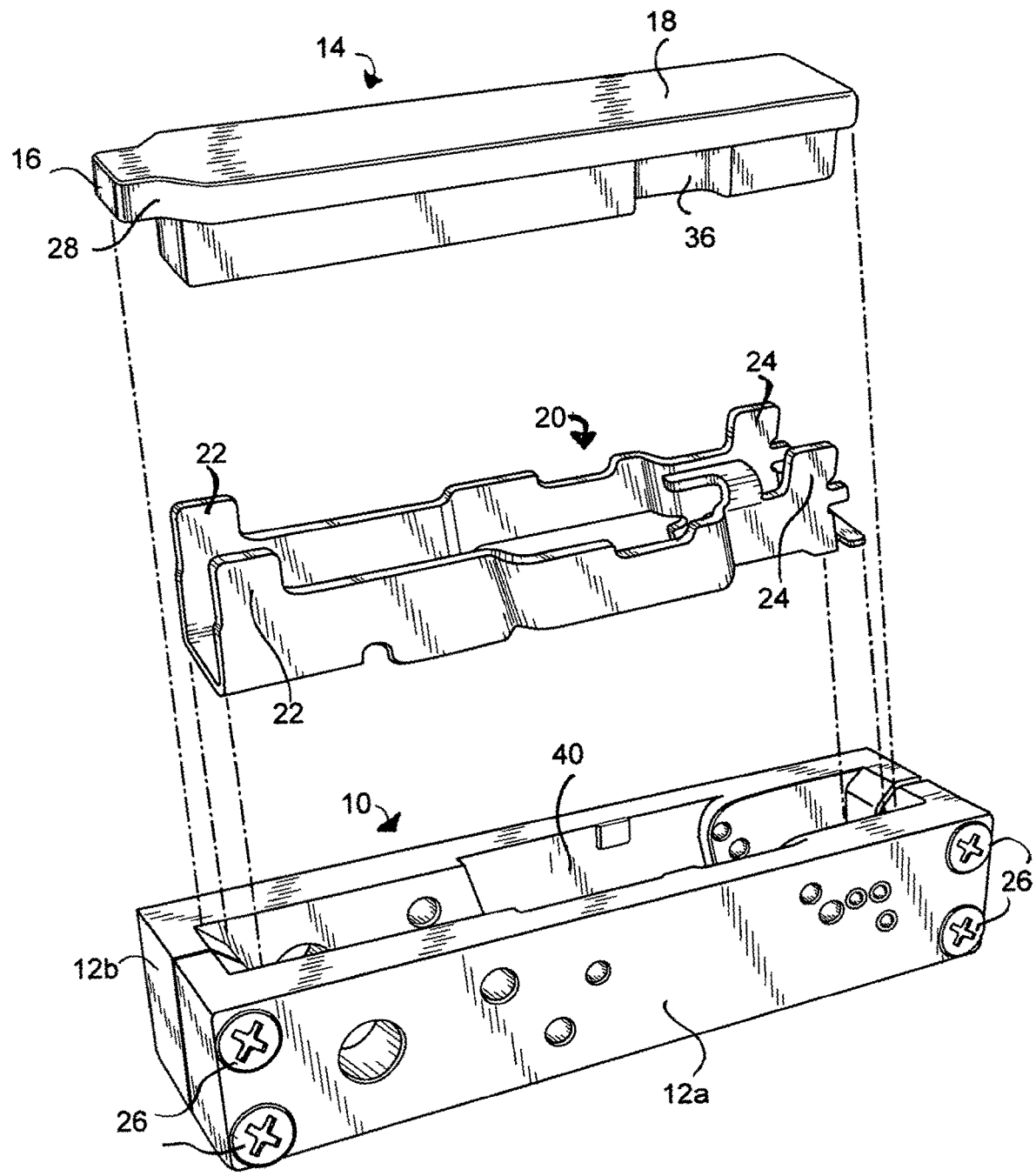
FIG. 1 is an exploded view of the tool jig showing its orientation and its various parts and how a firearm receiver fits within the tool jig.

Turning now to FIG. 1, tool jig 10 is described in an exploded view showing main jig body 12a and 12b mated together for the insertion of receiver 20. Jig top plate 14 is sized to fit within opening 40 designed for receiver 20 to be dropped into for working the receiver as will be described below. Main jig body 12a and 12b are mated together using screws 26 to mate the halves forming jig receiver opening 40 shown in FIG. 1.

Figure 4:
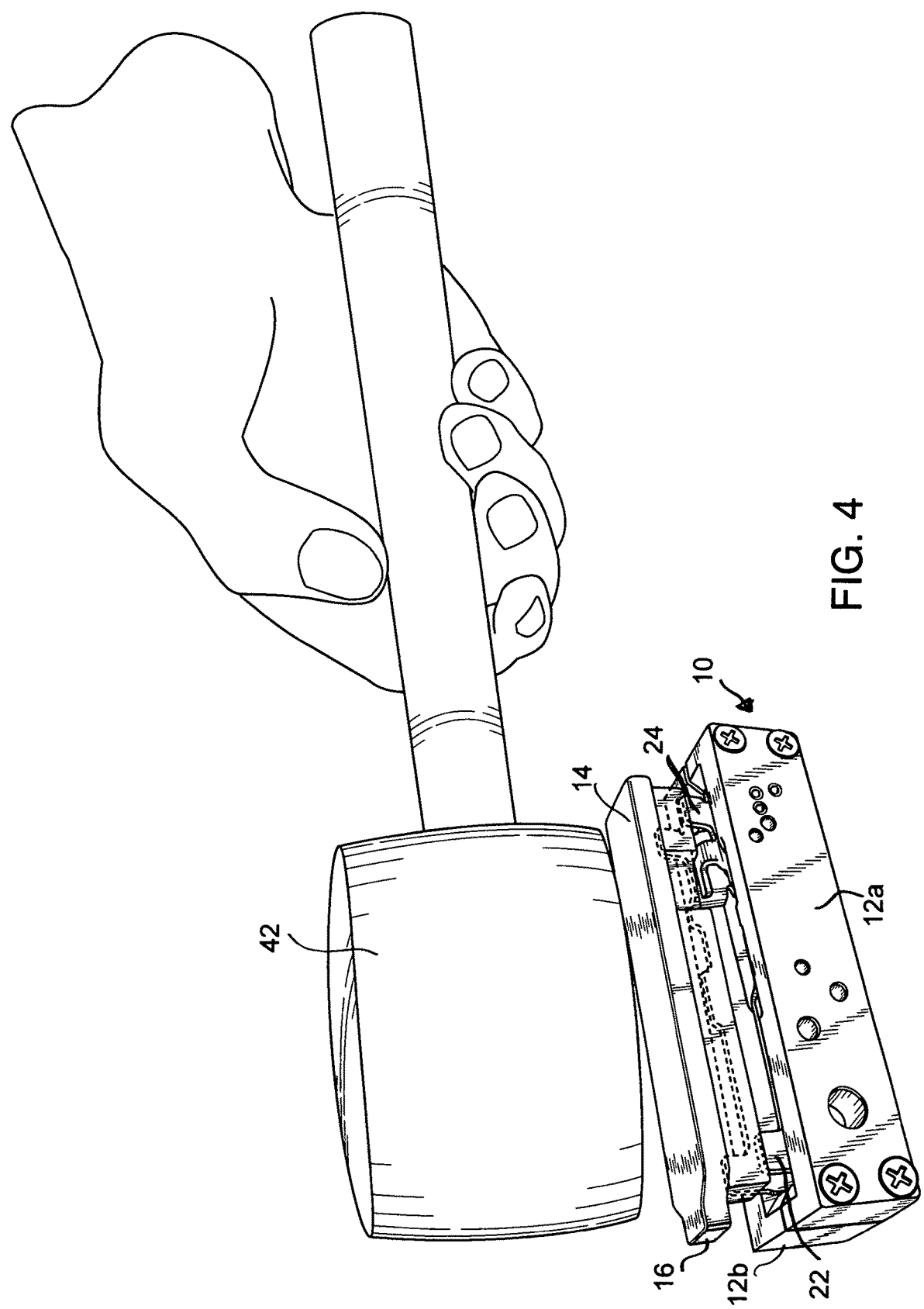
FIG. 4 is a pictorial diagram of the use of the tool jig demonstrating working a 80% firearm receiver and bending the rails necessary to complete the work as described.

Once receiver 20 is dropped into receiver opening 40 within jig 10, jig 10 can be placed into a vice to stabilize its position and hold it fast. The jig top plate 14 includes jig forming nose 16 shown in FIG. 1. This top plate 14 is used to assist in forming front receiver rails 22 and rear receiver rails 24 by assisting in bending them outward once receiver 20 is placed in opening 40. As shown in FIG. 4, front receiver rails 22 and rear receiver rails 24 extend outward from jig receiver opening 40 and need to be bent orthogonally, outwardly by physically working the rails.

Figure 5:
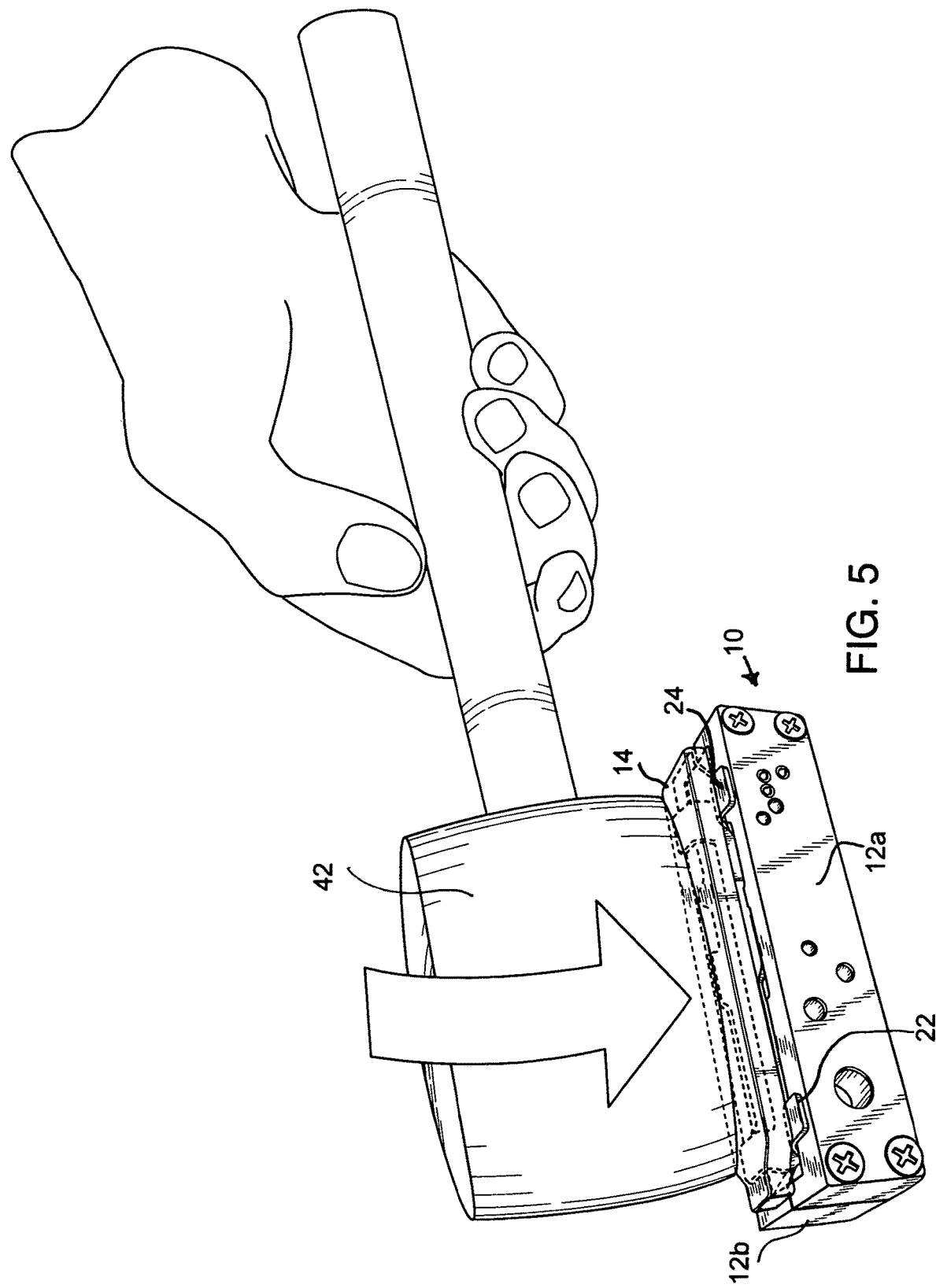
FIG. 5 is a pictorial diagram of the tool jig in its final position when metal working an 80% receiver.

Jig forming nose 16 is used to assist in flattening front receiver rails 22 and rear receiver rails 24 by working the rails outwardly by forcing top plate 14 down and bending rails 22 at a right angle to receiver 20. When this is done, it can be appreciated that nose 16 can be forced between receiver rails 22 and receiver rails 24 such as to cause them to begin to move outwardly as suggested in FIG. 5. While this isn't a necessary step in itself, it has been noted that by easing the rails outwardly using jig forming nose 16 urged between front receiver rails 22 and then rear receiver rails 24, said rails begin to migrate in an outwardly direction thereby allowing continued working of the middle in those rails as shown in FIG. 5. This has been found to be the most effective method for working receiver 20 in a fashion that allows the most precise fitting and metal working of the receiver to make it suitable for fashioning into a proper firearm.

It is also suggested that in forcing and thereby forming front receiver rails 22 and rear receiver rails 24 in an outwardly direction away from the center line of receiver 20, machine oil is used to ease the metal working of either the metal being worked by jig forming nose 16 or any other method the user might decide to employ to begin the forming of said rails.

The final bending of the rails takes place with the assistance of top plate 14 in a position as shown in FIG. 4 in which top plate flat side 18 is used to force top plate 14 into receiver 20 by working the said top plate through use of mallet 42. Mallet 42 can be a shop hammer or mallet sufficient to provide the force necessary to urge tool 14 within receiver 20, thereby completing the bending action of receiver rails 22 and 24. It is also possible to use another forcing means to drive jig top plate 14 down upon receiver 20.

FIG. 5 demonstrates the final position of front receiver rails 22 and rear receiver rails 24 placing them in a condition to be trimmed by a saw or other cutting tool. Mallet 42 is used to strike top plate 14 on top plate flat side 18 until the body of top plate 14 is forced within the receiver thereby completing the bending process. Receiver 20 is now ready to be completed by sawing the excess rail materials thereby trimming front rail 22 and rear rail 24. The saw cut is made along the edge of top plate 14 to trim the rails to be flush with the edge. In that regard, top plate 14 is a means to precisely measure the length of extension of front rail 22.

Figure 2:
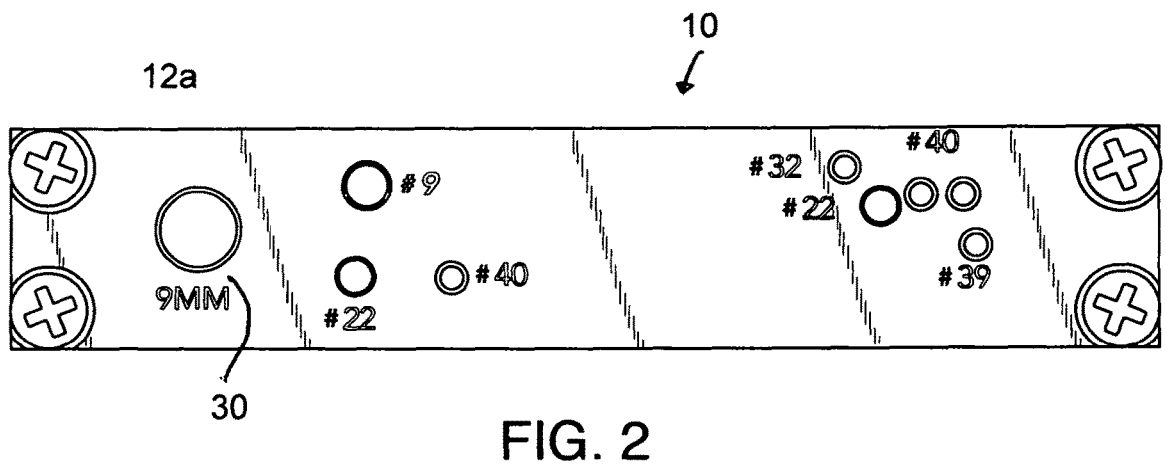
FIG. 2 is a view of one side of the main body of the tool jig showing an example of the required holes and spacing to drill and machine a receiver for a pistol-style firearm.
Figure 3:
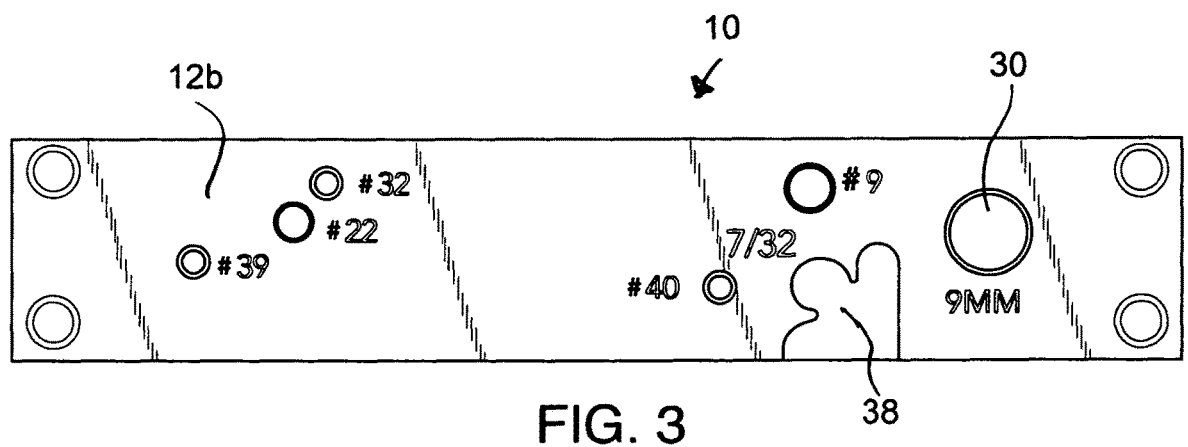
FIG. 3 is a view of the opposite side of the main body of the tool jig showing an example of the required holes and spacing to drill and machine a receiver for a pistol-style firearm.

Turning to FIGS. 2 and 3, opposite sides of main body of jig 10 is seen with prearranged holes to provide drilling and tapping as is necessary to bring receiver 20 into final machined form with the appropriate screw and bearing holes as would match the needs of the preferred embodiment of this invention for a popular-style handgun. The holes shown in FIG. 2 and the other side of jig 10 in FIG. 3 provides precise prearranged alignments so that receiver 20 is held tightly within jig 10 ready to be worked and completed. FIGS. 2 and 3 also illustrate holes in tool jig 10 to guide the drilling of the unfinished receiver held within jig 10 when the receiver is placed therein as described above. Each of the holes shown in FIGS. 2 and 3 are labeled with the size of a drill bit necessary to complete the action. For example, in FIGS. 2 and 3 it is shown 9 MM hole 30 which is the size of the drill bit that would be used to work the article of manufacture within the jig. The other holes in jig body 12a and 12b are labeled with representative drill sizes without separate number labeling for clarity.

For example, in FIG. 2 it can be seen that drilling holes are labeled such as #22, #9 and #40. These numbers represent the drill sizes that the user would have to apply to the existing labeled holes to have a drill bit fit correctly. The rest of the labels are similar except for trigger passthrough cutout 38. In FIG. 3, cutout 38 is accomplished by drilling a 7/32 hole as labeled on the Figure in the center and then following the irregular cutout shape in order to form a proper trigger passthrough necessary in order for the finished receiver being worked to operate properly with the parts necessary to complete a pistol. Tool jig 10 in this fashion is designed to allow all the cuts and drill holes as well as the forming of the receiver slide rails to be formed in one working of receiver 20 dropped into to the tool. There is no need to remove receiver 20, alter it by placing it at a different angle or inserting it separately in order to complete the piece.

A method of making and completing a pistol receiver is evident from a review of FIG. 4 and FIG. 5 where the steps for making a receiver include placing an uncompleted article of manufacture within tool jig 10 formed by constructing jig body 12a and jig body 12b together with screws 26, placing the uncompleted article of manufacture or metalwork within the constructed jig 10, and thereafter placing the receiver within the jig. After that step, top jig plate 14 is placed on top of the receiver to fit down within the inner cavity of a typical receiver. Then, by mechanical action illustrated in the figures, a force means such as mallet 42 is used to strike top plate 14 until receiver rails 22 and 24 are formed into place by the forcing of jig top plate 14 down into the cavities formed by jig body 12a and 12b. The method of forcing is shown in considering FIG. 4 and FIG. 5 while it can be appreciated that the shape of cutout cavity 36 preserves part of the receiver extending above the cavity formed by jig body 12a and 12b to prevent it from being altered while the receiver rails 22 and 24 are forced outward and flattened as desired.

Although the invention has been described in accordance with the preferred embodiment, it will be appreciated by those skilled in the art that the application of the present invention is useful in a variety of configurations and designs not specifically described above. All such designs and applications are considered to be within the scope of the present disclosure, and the invention is applicable across a wide variety of applications. Such applications are considered within the scope and spirit of the present invention.

What is claimed:

1. A tool jig for finishing a partial receiver for constructing a pistol comprised of:

A base comprised of two halves together forming the base by affixing each half to the other by attachment means, said base shaped to accept an unfinished pistol receiver therein, said base configured to allow protrusion of said receiver to expose malleable elements of the receiver above the top of the base; and a top piece shaped to conform to a volume defined by inside dimensions of said receiver to be accepted therein, when the top piece is placed over the base;

said top piece also including a flat striking surface to provide a means to transfer impulse energy to the top piece to drive the top piece into the unfinished receiver;

wherein further the base is comprised of pre-drilled holes to locate and guide a drill into the receiver in locations needed to form the receiver to accept fasteners.

2. A method of constructing a pistol firearm receiver using a specialized tool jig specifically configured to allow protrusion of said receiver to expose malleable elements of the receiver above the top of a base comprised of the steps of:

Placing an incomplete article of manufacture comprised itself of an 80% completed pistol receiver into a bottom portion of a tool jig;

placing a top plate of the tool jig into an internal area of said incomplete receiver;

driving said top plate downward into said receiver using forcing means;

continuing said forcing means until said top plate is driven as far as it will travel into said receiver; and completing drilling of required holes in said article of manufacture while the article remains in the jig.

3. Apparatus for forming a firearm receiver from an 80% partial pistol receiver comprising:

A main jig body itself comprised of two halves of generally similar dimensions fashioned to be assembled together to form a rectangular shape by fastening means with inside dimensions of said body shaped to accept an 80% completed pistol receiver placed within said inside dimensions;

each of said two halves containing holes within a side corresponding to preselected locations of penetrations necessary to attach other pistol parts to the receiver necessary to assemble a completed firearm;

and a jig top plate shaped to correspond with the shape of the interior dimensions of said partial pistol receiver comprised of a solid volume to insert downwardly into said 80% partial pistol receiver, said top plate including a flat side disposed on the upper side of the plate for receiving a downward force, being opposite the side of the main jig body, said top plate shaped to correspond to desired forming of the said receiver when the top plate is forced downwardly into the receiver placed into the main jig body.

4. The apparatus of claim 3 further including each half of the main jig body containing labeling of the size of hole drilling and fasteners necessary to use the main jig to machine to completion the said partial receiver being processed in the main jig body.

\* \* \* \* \*